United States Patent
Becvar et al.

(10) Patent No.: US 8,057,552 B2
(45) Date of Patent: *Nov. 15, 2011

(54) SYSTEM AND METHOD FOR CREATING INK ART

(76) Inventors: James E. Becvar, El Paso, TX (US); Laura Becvar, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/868,368

(22) Filed: Oct. 5, 2007

(65) Prior Publication Data

US 2008/0092308 A1    Apr. 24, 2008

Related U.S. Application Data (60) Provisional application No. 60/828,546, filed on Oct. 6, 2006.

(51) Int. Cl.
*C08F 283/00* (2006.01)

(52) U.S. Cl. ............... 8/115.53; 8/115.51; 8/115.54; 8/444; 106/31.13; 106/31.15; 106/31.32; 106/31.64; 206/575; 222/187

(58) Field of Classification Search ............. 8/444, 636, 8/115.51, 115.53, 115.54; 428/24, 195, 67; 160/84.01; 427/171; 368/327; 524/106; 106/31.13, 31.15, 31.32, 31.64; 206/575; 222/187

See application file for complete search history.

(56) References Cited

U.S. PATENT DOCUMENTS

| | | | |
|---|---|---|---|
| 1,623,709 A | 4/1927 | Smith | |
| 2,296,379 A | 9/1942 | Croft | |
| 4,477,511 A | 10/1984 | Hanig | |
| 5,389,426 A * | 2/1995 | Arens et al. | 428/195.1 |
| 5,554,198 A | 9/1996 | Poplin | |
| 5,756,166 A * | 5/1998 | Shinohara | 428/24 |
| 6,454,842 B1 | 9/2002 | Vernardakis et al. | |
| 6,586,045 B1 * | 7/2003 | Cole | 427/171 |
| 7,629,400 B2 * | 12/2009 | Hyman | 524/106 |
| 2003/0035917 A1 * | 2/2003 | Hyman | 428/67 |
| 2004/0108078 A1 * | 6/2004 | Chen et al. | 160/84.01 |
| 2005/0022313 A1 * | 2/2005 | Scheidler | 8/115.51 |
| 2005/0048279 A1 | 3/2005 | Watson et al. | |
| 2006/0114754 A1 * | 6/2006 | MacDonald et al. | 368/327 |

FOREIGN PATENT DOCUMENTS

JP    2000-037997    * 2/2000

* cited by examiner

*Primary Examiner* — Khanh T Nguyen (74) *Attorney, Agent, or Firm* — Janeen Vilven; Peacock Myers, P.C.

(57) ABSTRACT

A system, method and apparatus is disclosed for coloring a substantially wicking substrate comprising applying to a substantially wicking substrate an ink comprising a first dye and a second dye applying a first solvent to the substantially wicking substrate to move the first dye and or the second dye in a defined direction coloring at least a portion of the substantially wicking substrate by allowing the first solvent to move through a portion of the first dye for a first distance from the point of origin of the ink and the second dye a second distance from the point of origin of the ink wherein the first distance is sufficiently different from the second distance to visualize a separation between the first dye and the second dye shaping a portion of the colored wicking substrate into a form and affixing the form onto a support for display.

2 Claims, 8 Drawing Sheets

SYSTEM AND METHOD FOR CREATING INK ART

CROSS REFERENCE TO RELATED APPLICATION

This application claims priority to and the benefit of the filing of U.S. Provisional Patent Application Ser. No. 60/828, 546, entitled "A System and Method for Creating Ink Art", filed on Oct. 6, 2006, and the specification and claims thereof are incorporated herein by reference.

BACKGROUND

The present invention relates generally to the field of methods for coloring a substrate and creating a water color or tie-dye effect on the substrate and subsequent use in a greeting card or other product.

A colorant, or the substance used to give color to the ink, is either dye or pigmentation. The colorant, consisting of molecules or small particles, blends with a carrier-based solution or suspension. A carrier-dye based ink tints or stains the substrate on a molecular level and gives color to the substrate by virtue of differential absorption or reflection of some region or regions of the visible electromagnetic radiation spectrum of light.

Chromatography is an analytical process for separating mixtures containing substances which may or may not be colored. In the chromatographic process, the substances in a mixture move by intentional displacement of a mobile phase in a defined direction through a stationary phase which separates one molecular substance from other molecules in a mixture. Chromatography exploits the differences in partitioning behavior between a mobile phase (solvent) and a stationary phase to separate the components in a mixture. Components of a mixture may be chemically or physically interacting with the mobile and stationary phases based on charge, molecular size, molecular polarity, hydrogen bonding, relative solubility or adsorption.

Watercolor art often requires repeated sequential applications of wet colorant to substrate interspersed with time periods of drying. The watercolor is applied to a position using a brush. Effort is taken to prevent the color from running. Young children and people with handicaps have a difficult time using a brush and keeping the colors from bleeding.

It should be appreciated that this invention, methods, and processes would work equally well with 'dyes' and 'inks' that are not initially visible to the eye, e.g. 'invisible inks', that are revealed only after a secondary treatment such as short wave ultraviolet irradiation, heating, or chemical treatment, or a combination thereof, in which a chemical or photochemical process takes place to produce the colored regions of the substantially wicking substrate.

SUMMARY OF THE INVENTION

The present invention provides a method for applying colored ink to a substantially wicking or porous substrate and separating or partially separating one or more colorants in the ink to create dye patterns thereon to produce a color substrate such as colored paper. With this system and method one can make effortless ethereal expressions in a solvent-entrapping enclosure.

One embodiment of the present invention provides a method for coloring a substantially wicking substrate. The method comprises applying to a substantially wicking substrate an ink comprising a first dye and a second dye. A first solvent is applied to the substantially wicking substrate to move the first dye and or the second dye in a defined direction. At least a portion of the substantially wicking substrate is colored by allowing the first solvent to move through a portion of the first dye for a first distance from the point of origin of the ink and the second dye a second distance from the point of origin of the ink wherein the first distance is sufficiently different from the second distance to visualize a separation between the first dye and the second dye. At least a portion of the colored wicking substrate is shaped into a form. The form is affixed onto a support for display.

In an alternative embodiment, a second solvent is applied to the substantially wicking substrate having the ink applied thereon. The second solvent proceeds through the point of origin in a different direction or same direction from the direction of the first solvent. The second solvent is the same or different from the first solvent. In a preferred embodiment the support is selected from wood, plastic, paper, metal, glass, ceramic, bone, fish scale, animal hide, illumination means, or a combination thereof. In a preferred embodiment, the solvent is selected from water, alcohols, aliphatic hydrocarbons, amides, amines, aromatic hydrocarbons, halogenated hydrocarbons, ethers, esters, acetates, ketones, citrus oils, glycols, and glycol ethers, acids, bases, aldehydes, soaps, detergents, surfactants and dimethyl sulfoxide or any combination thereof.

In a preferred embodiment, shaping is selected from folding, bending, tearing, cutting, burning, and or melting a shape from the wicking substrate by the user.

In a more preferred embodiment, affixing comprises one or more selected from stapling, folding, gluing, pasting, adhering, cementing, taping, pinning, hooking, crimping, and framing.

In a more preferred embodiment, the method of applying is via an applicator held in relation to the substantially wicking substrate by an animal or object shaped applicator holder.

In a preferred embodiment the means of display includes illumination for enhanced visualization of the colored wicking substrate.

Another embodiment of the present invention comprises a container for developing a colored substantially wicking substrate. The container comprises a top tray openably connected to a bottom tray to form an interior compartment when the top tray is placed in contact with the bottom tray to close the container; a suspending means for suspending a substantially wicking substrate within the container; and a solvent dispenser for dispensing a solvent to the substantially wicking substrate. In a preferred embodiment, the top tray, the bottom tray or both comprise one or more protrusions located on the interior face of the top tray, the bottom tray or both to separate the substantially wicking substrate from adhering to the interior face of a top tray, bottom tray or both. In another preferred embodiment the solvent dispenser is a sponge or trough. In a more preferred embodiment, the container includes a holder for holding a substantially wicking substrate, ink, solvent or any combination thereof. In another preferred embodiment, the container includes a tray and is openably connected to the bottom tray by one or more hinges. In a more preferred embodiment, the secondary treatment is illumination of the substantially wicking substrate using wavelengths selected from between about 200 nm-1500 nm irradiation, heating, chemical treatment, or a combination thereof.

In a more preferred embodiment, the container further comprises a port for introducing into the container solvent from the exterior of the container to the interior of the container wherein the port is in communication with the solvent dispenser.

In a preferred embodiment, the protrusions are located randomly about the interior face of the top tray.

Another embodiment of the present invention is a substrate coloring kit comprising a substantially wicking substrate, a solvent applicator for applying solvent, and a pen for applying ink comprising one or more colored dyes.

In another embodiment, the kit further comprises a solvent for diffusely coloring the substantially wicking substrate with the colored dyes to produce a watercolor like effect on the substantially wicking substrate.

Another embodiment of the present invention is an object shaped solvent applicator holder for holding a solvent applicator at a distance in relation to a substantially wicking substrate comprises a suspending member for suspending a solvent applicator above a substantially wicking substrate resting on a surface, and a base of the solvent applicator holder that rests upon the surface and keeps the solvent applicator in a substantially vertical position above the substantially wicking substrate such that the solvent within the solvent applicator is in communication with the substantially wicking substrate.

In a preferred embodiment the object shaped solvent applicator holder is an animal or plant shaped holder.

In a more preferred embodiment the ink is initially invisible to the naked eye requiring a secondary treatment for visualization.

It is an aspect of one embodiment of the present invention to provide a new method to create art and artistic design.

It is another aspect of one embodiment of the present invention to color a substantially wicking surface using ink producing a watercolor like effect.

It is yet another aspect of one embodiment of the present invention to make jewelry.

It is a further aspect of one embodiment of the present invention to make a greeting card.

It is still another aspect of one embodiment of the present invention to make art or design suitable for framing or displaying.

It is a further aspect of one embodiment of the present invention to provide a kit for coloring substantially wicking surfaces using chromatography instructions to produce watercolor or tie-dye like effects.

It is a further aspect of one embodiment of the present invention to provide an apparatus for use in processing and developing watercolor like effect on a substantially wicking substrate.

It is an additional aspect of one embodiment of the present invention to provide a teaching tool for chromatography principles.

Additional objects and advantages of the present invention will be apparent in the following detailed description read in conjunction with the accompanying drawings and figures.

DETAILED DESCRIPTION OF THE INVENTION

Definitions

The word "a" as used herein means one or more.

The word "ink" as used herein means a dispersion of a pigment or a solution of a dye either being permanent, semi-permanent or non-permanent in a carrier vehicle.

The word "solvent" as used herein means one or more selected from water, alcohols, aliphatic hydrocarbons, amides/amines, aromatic hydrocarbons, halogenated hydrocarbons, ethers, esters, amines, acetates, ketones, citrus oil, glycols, and glycol ethers, acids, bases, aldehydes, soaps, detergents, surfactants and dimethyl sulfoxide (DMSO) either alone or a combination thereof.

The words "substantially wicking substrate" as used herein means a separation phase matrix.

Different colored inks and different brands of ink contain different chemical molecules, for example dyes or colorants with chemically distinct properties as a result of the organic, inorganic, or other substances or molecules contained therein. The combination of different colored molecules or particles within ink can create colorful ink patterns on a porous substrate or substantially wicking substrate such as paper (but not limited thereto) when the ink is applied to the paper and a solvent is introduced to the paper thereafter.

Capillary action or gravity assisted capillary action draws the solvent through the substantially wicking substrate where the molecules of the dye reside. The solvent mobilizes the molecules of the dye and carries the molecules away from the point of origin where the ink was originally deposited. The molecules in the dye are deposited or carried throughout the substrate along the path of the solvent front to diffusely color the substrate with the dye molecules thereby creating coloration patterns. The distance the dye molecules may travel from the point of origin may be dependent upon several factors: the duration of time the substrate is exposed to the solvent, the presence of organic or other solvents in the ink, and the solvent type applied to the substrate. These factors can be controlled by the user. Inks consist of dye molecules or colorant particles dissolved or suspended in an ink solvent. Sometimes the dye molecules start to move as the applied solvent moves past on the substantially wicking substrate. Sometimes the dye zone (defined as the place on the substantially wicking substrate that the dye resides which is different than the origin location) moves for a distance, then stops moving even though the applied solvent continues to pass through the dye zone. This initial migration then "stoppage" is probably the result of the solubilizing effect of the solvent mixture within the ink ("ink solvent") carrying the dye for a distance before the applied solvent carries the "ink solvent" away from the dye.

Different colored dyes within an ink-blend will separate from each other on a substantially wicking substrate such as filter paper, chromatography paper, woven or pressed cloth, or paper towel and or other substrates that will be known to one of ordinary skill in the art. However the substantially wicking substrate is not limited to natural products as synthetic products such as a porous substrate made of rayon or any other synthetic product known by one of the ordinary skill in the art would suffice. The simple process of wetting a region of the ink-spotted substantially wicking substrate with one or more solvents, i.e. chromatographing the ink on the substantially wicking substrate with water, and/or an alcohol solvent for example begins the method. During the process of separating the dyes in the ink, the substantially wicking substrate becomes colored with the ink over a surface area that is greater than the surface area to which the ink was originally applied thereby coloring a larger area of the substantially wicking substrate.

The separated colors on the substrate create colorful and beautiful designs or regions on the substantially wicking substrate. Tie-dye like effects can be created. The path of the solvent front can be altered by applying hydrophobic substances to the substantially wicking surface, or by interrupting the continuity of the wicking surface (for example, by cutting slits or holes in the wicking surface).

The ink or dye can be applied to a dry piece of substantially wicking substrate or to a substantially wicking substrate which has previously been wetted with one or more solvents, such as water. Previously wetting the porous substrate can 1) help to draw the ink into the substrate faster during the dye application process, 2) speed up the chromatographic process, and 3) change the appearance of the developed colored substantially wicking substrate.

Shapes (e.g. hearts, leaves, flowers, animals) or designs can be formed from the differentially colored regions on the substantially wicking substrate or porous substrate. These colored designs or regions on the paper are further processed. Processing of the colored regions include drawing, cutting, shaping, tearing and folding. The processed regions can then be affixed to a support, (for example, a card stock or other surface or three-dimensional support) to enable the user to create an artistic design.

One embodiment of the present invention provides for a system and method for creating ink art. The process begins with applying ink to a point of origin on the substantially wicking substrate. A solvent is applied to an edge portion of the substantially wicking substrate thereafter. The texture of the substantially wicking substrate allows the solvent to move via capillary action through the substantially wicking substrate carrying some of the colored molecules from the dye from the point of origin to color a larger region of the substantially wicking substrate beyond and possibly including the original ink mark.

The different colored molecules are separated or partially separated within the substantially wicking substrate by chromatography that includes processing and developing the separation of the dyes in the ink on the substantially wicking substrate. Regions of the substantially wicking substrate are cut out and assembled onto a support to produce the final "artwork" product.

All or a portion of the diffusely colored substantially wicking substrate can be shaped into a form. The form can be applied to a support wherein the colored form is displayed.

Another embodiment of the present invention is a system and method for producing a diffusely colored effect on a substantially wicking substrate. The effect is produced by applying an ink comprising a dye to an area on the substrate such as paper. In another embodiment, an ink can be applied to two or more locations of the paper. To the inked paper a solvent is applied to move a dye molecule about the paper to produce a diffusely colored effect. The effect is similar, for example, to tie-dye or a water color.

Yet another embodiment of the present invention is a system and method for producing a diffusely colored effect on a substantially wicking substrate. The effect is produced by applying an ink comprising two or more dyes to an area on the substrate. The substrate is wicking (porous) and can be, for example, paper, cloth, filter paper, chromatography paper, woven or pressed cloth, paper towel or food products such as bread, rice cake but not limited thereto. Synthetic substances such as Dacron or Rayon (but not limited thereto) that form substantially wicking substrates would also suffice.

In another embodiment, an ink comprising two or more dyes can be applied to two or more locations of the paper. To the inked paper a solvent is applied to move the dye colorant about the paper to produce a diffusely colored paper. For example, if there are two dye application regions and both are equidistant from an edge of the substrate and the solvent is applied at that edge, the colorant in both application regions would move more or less in the same direction, perpendicular to the edge; whereas, if the solvent is added between two dye application regions, the colorant in the two application regions would move in opposite directions away from the solvent application site. One can envision three or more dye application regions placed in a more or less circular pattern. If the solvent is applied in the center of that circle, the colorant in the application regions would move in a more or less radial fashion spreading away from the center.

Another embodiment of the present invention provides a kit comprising ink(s), a substantially wicking substrate, a solvent, a solvent applicator, an applicator holder, and instructions.

In an alternate embodiment, card stock which is a substantially wicking substrate receives the initial sample of ink. The solvent (e.g. water) is dripped slowly onto the surface of the card stock to create a radial or other design on the card stock. The solvent moves through the substrate by capillary action creating a design as molecules of dye move through the paper.

The solvent can be introduced to the substrate through a wick in the container holding the solvent. The solvent moves to the substrate through the wick via gravity or capillary action. A container may be in the shape of a plastic transfer pipettor wherein a wick is placed in the tip. Part of the bulb portion of the pipettor can be removed (cut off) for loading of the solvent.

Another embodiment of the present invention provides for a system for creating substrates colored in a tie-dye or watercolor effect. The system includes a holder device for suspending the solvent applicator over the substantially wicking substrate. The holder device may be in a recognizable shape such as a spider, dinosaur, flower, rocket, or house. The holder device supports a solvent applicator such as a pipette which may have a wick at the tip. The solvent applicator contains solvent wherein the solvent applicator is held in a substantially vertical position over the substantially wicking substrate such that the solvent is delivered to the substantially wicking substrate via gravity. The tip of the solvent applicator closest to the substantially wicking substrate may be in direct contact with the substantially wicking substrate or it may be in close proximity such that the solvent is in communication to the substantially wicking substrate for example via the wick at the tip of the solvent applicator. Further the holder device may be in one of the following shapes —Spider, Flower, Rocket, House, Bug, fly, bee, wasp, Alligator, or tyrannosaurus.

For example a TYRANNOSAURUS REX applicator holder could stand like a tripod with tail and two hind legs as the three legs of the tripod or base on a surface. Alternatively, an applicator holder could hold the solvent applicator with its two small front legs and large open mouth twisted so the jaws are horizontal instead of vertical and grasps the bulb of the solvent applicator in its jaws.

In an alternative embodiment, a portion of the substantially wicking substrate for example card stock could be introduced to a reservoir of solvent wherein the solvent wicks through the card stock to diffuse the dye molecules in an artistic pattern through the card stock. For example a lily pad shape having a stem/wick formed from a wicking substrate wherein the wick of the substantially wicking substrate brings the solvent to the ink via capillary action.

In another embodiment, the porous stationary phase could be precut into shapes to "teach" the experimentalist user what other variations might be explored. Almost all commercial ink samples produce interesting designs. The inks to be chromatographed could also be fluorescent or phosphorescent and illuminated to be revealed or to produce an interesting variation in the final product.

In yet another embodiment, the substrate would contain a preprinted template for applying the ink thereto. The template would be arranged to create an artistic image when inked and/or chromatographed. The preprinted template can be made of a dye or pigment. If the template is made with an insoluble pigment like (but not limited to) carbon black, the solvent would not affect the template.

According to yet another embodiment, a kit similar to an old-fashioned "chemistry kit" is provided for chromatography. This kit consists of one or more of the following: a variety of paper sheets, many of them white "filter" or "chromatography" papers; a set of ink pens of different colors; some may be phosphorescent or fluorescent; a waterproof plastic sheet to protect the tabletop or work-surface; (possibly one or more jars or containers: as developing and processing chambers), several plastic pipettors with volume increment markings, one or more solvent delivery system holders or containers, any wavelength illuminator for example long wave ultraviolet lamp or apparatus or LED(s) light source and power supply ("black light") for revealing the phosphorescent or fluorescent dyes, a pair of children's scissors, and an instruction booklet with a few suggestions and examples of results. Special pens that deliver more ink than would be desirable in normal writing use may be part of the kit. (Bleeder pens)

The instructions direct the user to start with tap water as the solvent system and perhaps just one ink pen to produce the strange colorful patterns (nearly effortless ethereal expressions) in the developed substantially wicking substrate colored by the process. Repeat the process to see what happens (good science!). Repeat the process with a different colored pen. Repeat the process with several different colored pens. Repeat the process with some rubbing alcohol in the water. Repeat the process with a little soap in the water. Repeat the process with vinegar instead of water. Repeat the process with deionized or distilled water. Repeat the process with a little table salt in the water. These are examples of scientific investigation.

The system and method of the present invention may create unusual patterns during the development phase of the separation process. The papers should not necessarily be all identical. Some may have non-uniformities in the fiber structure of the paper. These non-uniformities cause strange designs during the development process.

Figure 1:
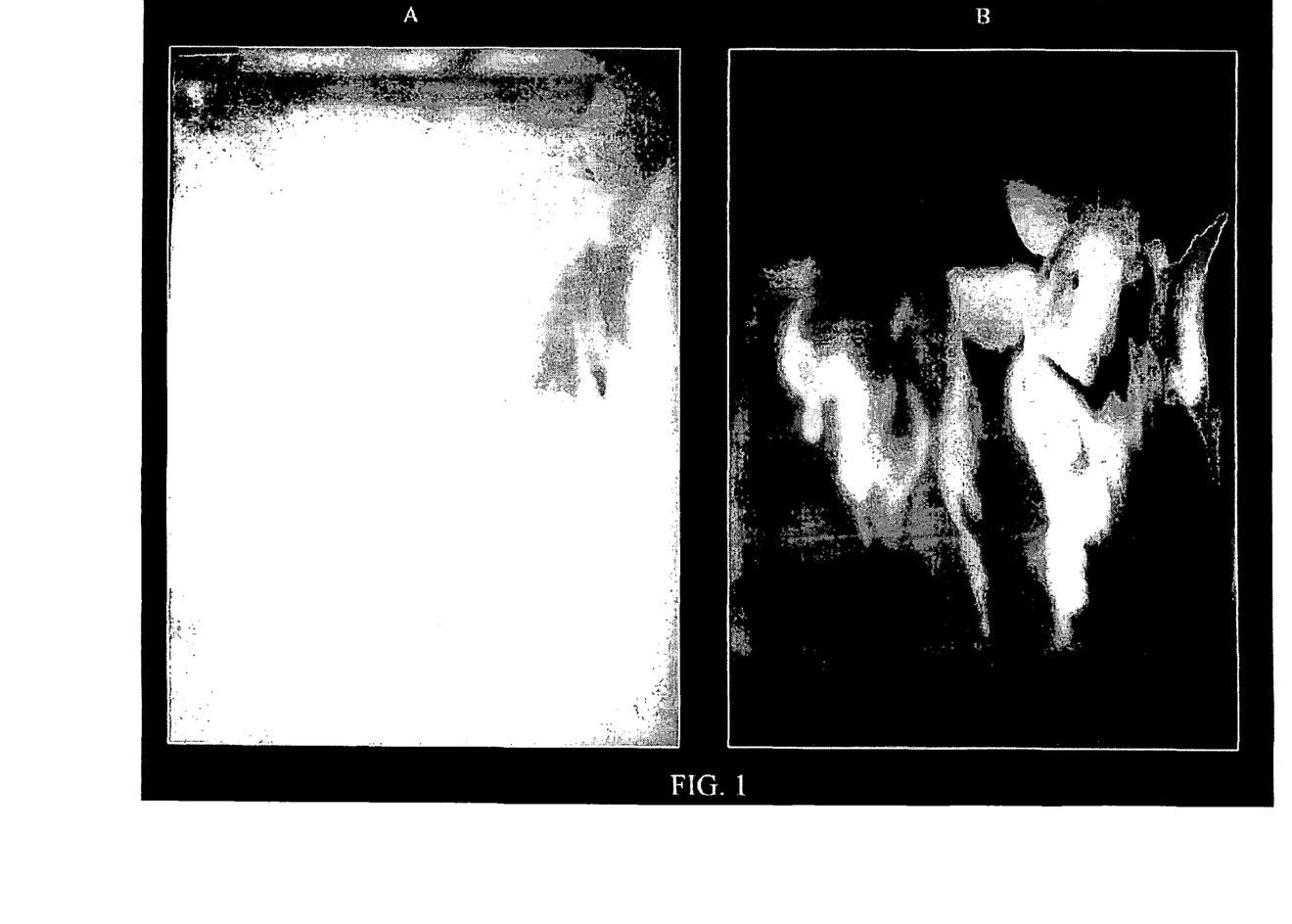
FIG. 1 illustrates a substantially wicking substrate dyed according to one embodiment of the present invention.

Referring now to FIG. 1, one embodiment of a substantially wicking substrate being dyed is illustrated. The developed image as viewed is enhanced upon exposure to a user defined wavelength selected to enhances the color of the dye and substrate. Panel A is illuminated in room light and Panel B is illuminated in ultraviolet wavelengths.

Figure 2:
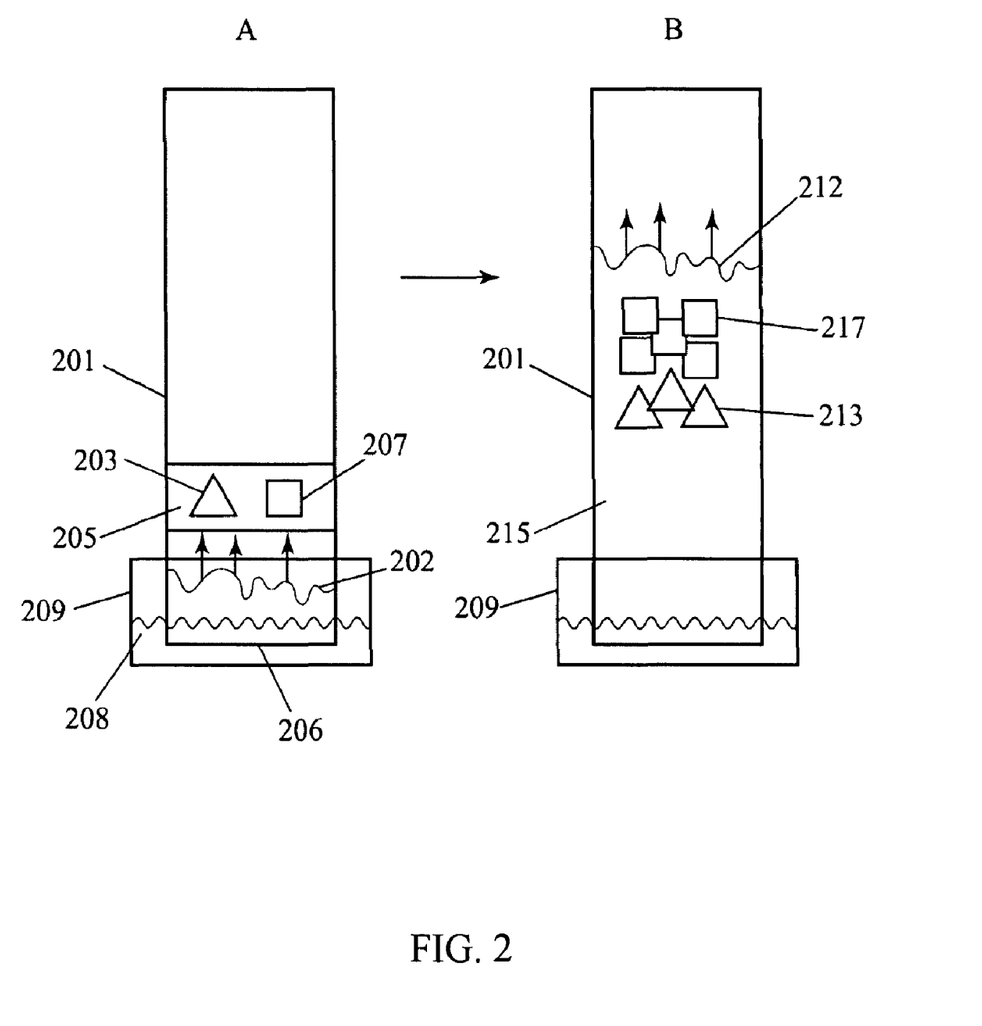
FIG. 2 illustrates separation of a first dye from a second dye to create a colored substantially wicking substrate.

Referring now to FIG. 2, a method of producing a watercolor or like effect on a substantially wicking substrate in the absence of brushes is illustrated.

The following materials are suggested for use but are not limited thereto:
1. Plastic Sheet. Covering to protect tabletop from ink stains; e.g. 4 mil×3'×4'
2. One or more Glass or Plastic Chamber(s) (dimensions not critical). This could be a 1 quart wide mouth Mason Jar; could be more rectangular, e.g. 8" tall, 4"×8" base
3. Chromatography Paper. Many sheets, not necessarily all the same composition. Should fit conveniently and appropriately into Chamber item 2. above. All or only a few sheets with "marked" origin lines; could have some sheets for radial processing and development (described below)
4. Pens, colored, to provide inks for separation using one embodiment of the present system and method
5. Set of overlays, patterns, masks with outlines of different shapes, e.g. hearts, stars, trees, dog, cat, etc
6. Blank card stock, e.g. single fold, could be an assortment of sizes or one size, e.g. 5"×7", dozen or more
7. Envelopes to fit blank card stock
8. Scissors
9. Glue stick
10. Instruction book
11. water or other solvent
12. tape (e.g. masking tape or "scotch" tape)
13. sharpened pencil.

Panel A of FIG. 2 indicates the use of a pen (for example one from item 4 of the preceding paragraph) to apply ink having a first dye molecule 203 and a second dye molecule 207 applied to the dye zone 205 of the surface of a substantially wicking substrate 201, for example one or more sheets of paper. As ink is drawn by capillary action into fibers of the paper 201, a pen is moved along an origin line in a direction for example to the right in a manner that allows the ink to deposit in a wide line or alternatively the ink may be applied as one or more spots. It is fine if the ink is applied non-uniformly in the application zone 205 along the origin line, i.e. in bulges and thin spots. Further, the ink can be applied to a portion of the substantially wicking substrate or alternatively the ink can be applied to the entire substantially wicking substrate.

According to another embodiment, a diffuse color effect is produced on a substantially wicking substrate by re-inking the origin line to "load" more ink to the substantially wicking substrate such as a coffee filter paper. Alternatively ink from a second or third pen could be applied at the origin line before or during processing and development. The user could moisten the substantially wicking substrate at the origin line before applying ink to "bleed" ink or "load" the substantially wicking substrate with more ink or alter the design. Pens that deliver more ink than would normally be delivered by an ink pen in normal use are better because the intensity of color of the resolved colored zones during processing. Color intensity generally increases with amount of ink put on the substantially wicking substrate (e.g. paper) prior to processing and development.

The chamber 209 is prepared by pouring solvent 208 into it to a height of about 1 cm of water or less (perhaps 20 mL). The substantially wicking substrate 201 is placed vertically into chamber 209 so that bottom edge 206 of paper 201 touches or is under the surface of the water or solvent. Solvent 208 should immediately start moving up substantially wicking substrate 201 by capillary action as indicated by the arrows. Solvent front 202 moves in the substantially wicking substrate.

A user may secure substantially wicking substrate 201 to chamber 209 so that it will not fall into chamber 209 as the substantially wicking substrate gets wet. For example, substantially wicking substrate 201 can be secured to chamber 209 by a clamp, tape, or bending the top of the sheet over an edge of chamber 209 or any other equivalent means. Alternatively, substantially wicking substrate 201 can be suspended above chamber 209 by a support means such as a wire or string either attached to chamber 209 or independent from chamber 209.

Panel B of FIG. 2 illustrates development of the dyed substrate. Capillary action will allow the solvent 208 to slowly move up substantially wicking substrate 201 producing a visible solvent front 212 as more of substantially wicking substrate 201 gets wet with solvent. Solvent front 212 will pass by origin ("ink") zone 215 and will start to draw the colored molecules of ink up the substantially wicking substrate to the development zone. Since inks may be mixtures of molecules of different colors, different colored zones 213 will be produced by this process. In contrast, if the ink contains a monochromatic dye the ink will color the substrate in a diffuse water color or tie-dye effect.

It is suggested that a user cover the working surface with the plastic sheet, and flatten the sheet. This sheet protects the tabletop or working surface from being stained by dyes in the ink bleeding from pens or wet substantially wicking substrates loaded with ink.

Different colors that are separated during development and processing of the ink indicate different molecules with different chemical structures. These differences cause the molecules to separate from one another as the different molecules interact differently with the solvent and with the paper. Some molecules will attract more strongly with solvent (they will move faster), while some will attract more strongly with paper (they will move more slowly). These differences in rate of movement are reflected in the relative positions of the colored zones as they move up the paper and end up in different regions on the developed and colored substantially wicking substrate art.

Another embodiment is a method for producing a color effect on a substantially wicking surface 201 wherein an ink applied to a wicking substrate is developed after—or before—an ink on origin line is dry. The user removes the water colored substrate after a short running time to apply more ink to origin line; then returns the processed substrate to a chamber for reprocessing. This could be repeated a few times before solvent front reaches top of sheet. This could produce a set of "wavy" overlapping colored zones. For example, it might produce a pattern like the red/white field of the American flag. The user could partially process the substantially wicking substrate (e.g. paper), dry the paper, and start the process again to produce a different result.

In an alternative embodiment, an incompatible, immiscible solution to the solvent is coated onto or applied at different locations on substantially wicking substrate 201 to divert the solvent from the areas that are coated with the incompatible immiscible solution. The added complexity of the developed pattern contributes to the tie-dye or water color like effect on the substrate.

In another embodiment, a radially colored substantially wicking substrate is produced. In this instance a circular sheet of a substantially wicking substrate (for example chromatography paper) is cut to resemble a "lily pad".

Figure 3:
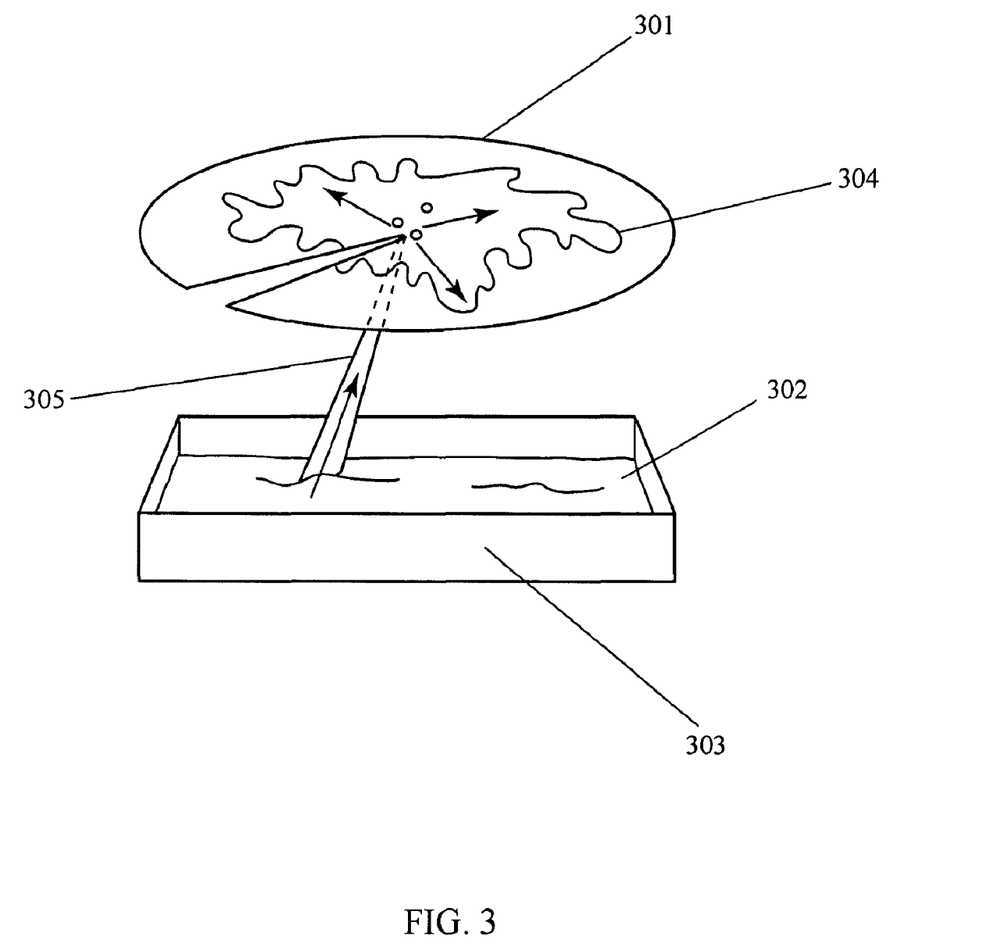
FIG. 3 illustrates application of a solvent to a substantially wicking substrate according to one embodiment of the present invention.

Referring now to FIG. 3, a strip 305 with approximately parallel edges is carefully cut from the edge of circle 301 a of substantially wicking substrate to the center or any location designated by user and carefully bent at an angle, for example 90° but not limited thereto. Strip 305 may be narrow for example about 5 mm. Strip 305 forms the wick for solvent 302 to move from the solvent reservoir 303 up to circular paper 301. Circular paper 301 can sit horizontally on the top of a cup or small glass holding the solvent. The "ink" can be a spot in the center of the circle of paper, at the end of the narrow strip, on a small (almost) circle around the center of the chromatography paper where the narrow strip attaches, or combination thereof but not limited thereto.

Still another embodiment provides for producing a different radial pattern on the colored substantially wicking substrate. The steps include applying the "ink" sample as a spot or small circle near the center of an intact substantially wicking substrate. Several inks can be applied as a ring or other design or as a series of spots. The paper does not have cuts or slits, i.e. not the "lily pad".

Figure 4:
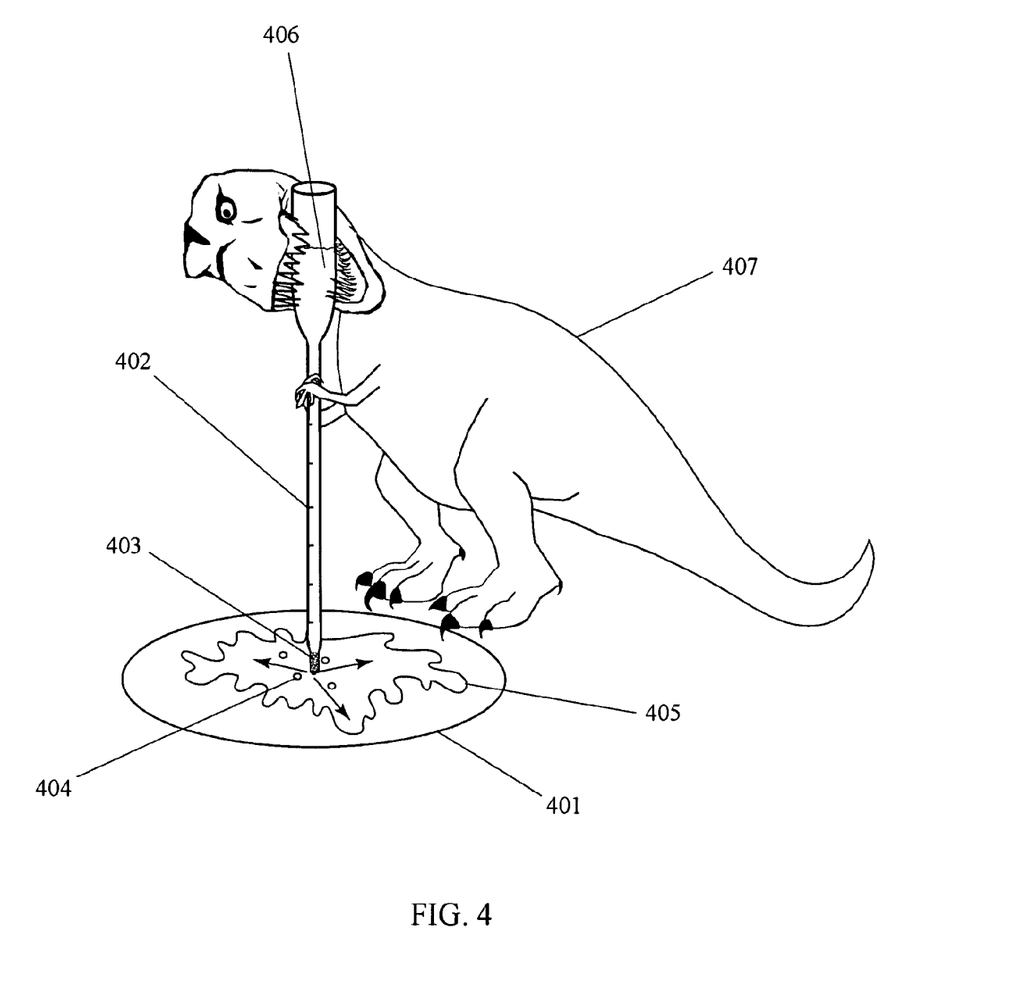
FIG. 4 illustrates a solvent applicator holder.

Referring now to FIG. 4, holder 407 for solvent container 402 containing solvent 406 therein is positioned above substantially wicking substrate 401 to deliver solvent 406 to a location on substantially wicking substrate 401, for example, the center of substantially wicking substrate 401 according to one embodiment of the present invention. Substantially wicking substrate 401 is intact (no slits or cuts) and lying in contact with a surface below, for example a non-solvent-permeable surface (not shown). Alternatively, substantially wicking substrate 401 may be suspended at its edge or at any other portion by for example laying substantially wicking substrate 401 onto a dish such that substantially wicking substrate 401 along its entire area does not make contact with the surface below as the developing colored substantially wicking substrate may be suspended with air above substantially wicking substrate 401 and air below the substantially wicking substrate (not shown). Solvent container 402 may have a porous plug 403 to facilitate transfer of solvent 406 to substantially wicking substrate at a desired rate of delivery. Solvent 406 carries ink 404 a distance greater than the area of the application zone (not shown).

Paper, as an example of a substantially wicking substrate, lying in contact with a surface often produces quite asymmetrical designs. Paper suspended above a surface produces considerably more symmetrical designs according to another embodiment of the present invention. Once a desired pattern has developed (it may not be necessary to allow the solvent front to travel the complete width, diameter, or surface area of the substantially wicking substrate, or to the edge) the substantially wicking substrate can be withdrawn from a solvent chamber or the solvent application process can be stopped (for example by removing the solvent applicator from the substantially wicking substrate). This allows the separation process to stop and the further separation of colored zones relative to one another to stop. This is an example of a finished "wet" colored substantially wicking substrate.

Figure 5:
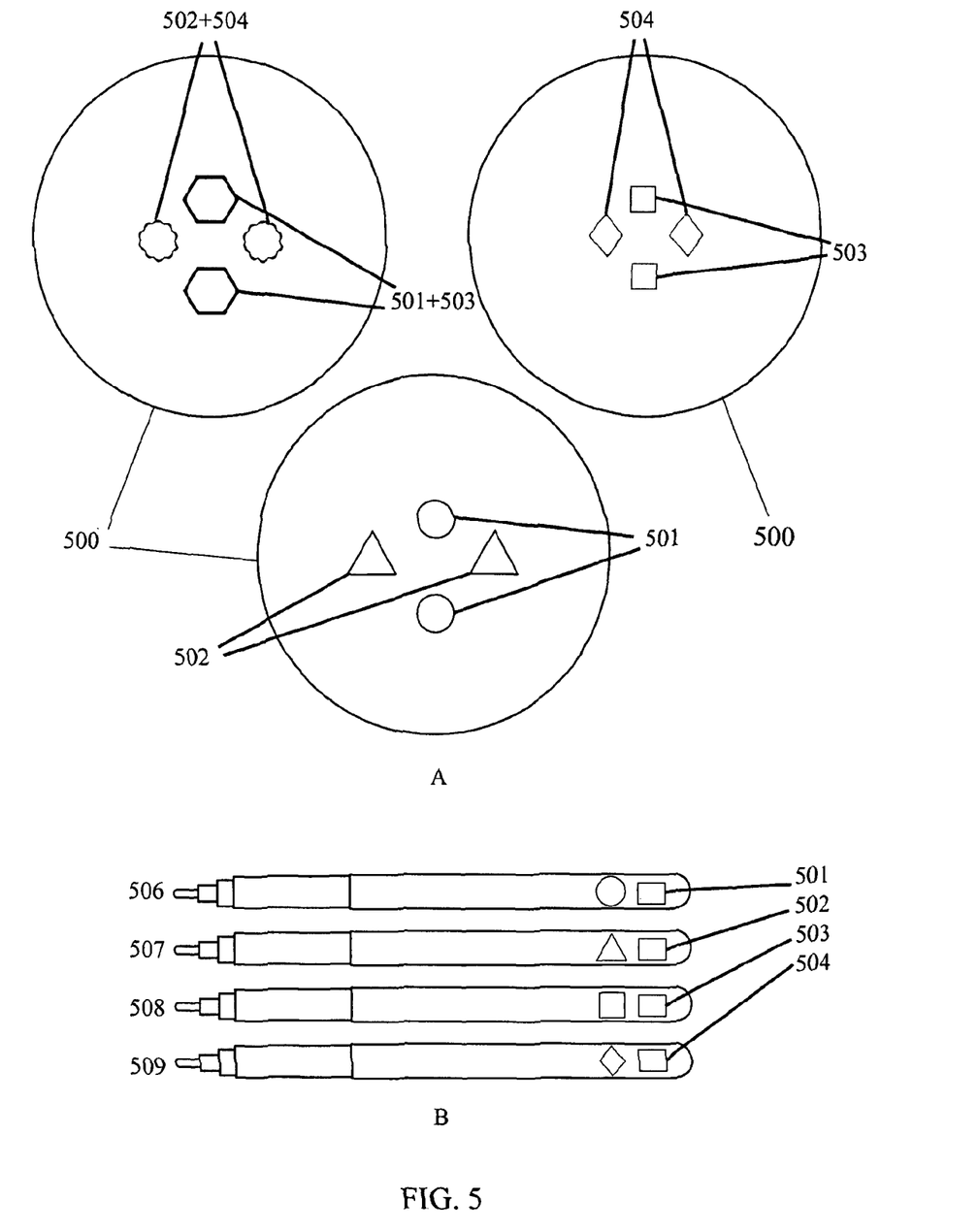
FIG. 5 illustrates application zones or patterns of inks for ink application supplied on the substantially wicking substrate according to one embodiment of the present invention.

Referring now to FIG. 5A, substantially wicking substrates 500 with zones 501, 502, 503, 504 identifying specific ink to be placed thereon is illustrated according to one embodiment of the present invention. Referring now to FIG. 5B, applicators 506, 507, 508, 509 having an ink corresponding to the ink required by the zone of the substantially wicking substrate as illustrated. A user applies the ink to one or more zones 501, 502, 503, and 504 to create an inked substantially wicking substrate. A solvent is applied and the ink and/or zones 501, 502, 503, and 504 indicated migrates with the applied solvent.

Figure 6:
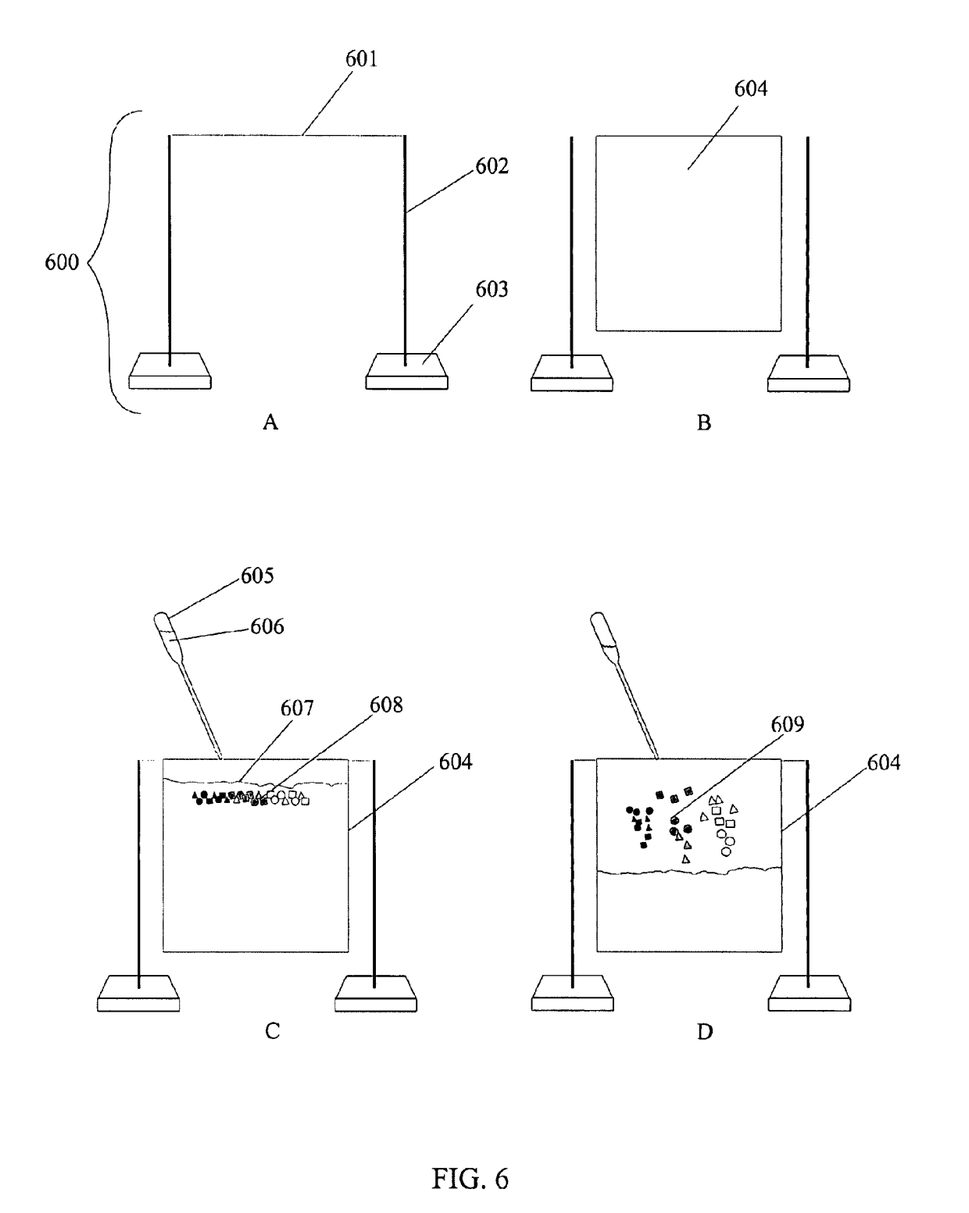
FIG. 6 illustrates a method for suspending a substantially wicking substrate for solvent application according to one embodiment of the present invention.

Referring now to FIG. 6, an apparatus 600 with a base 603 for suspending the substantially wicking substrate for processing and developing according to one embodiment of the present invention is illustrated. According to FIGS. 6A and 6B, frame 602 having suspending means 601 for use in suspending substantially wicking substrate 604 is illustrated. According to FIG. 6C, ink 608 is applied to substantially wicking substrate 604 and solvent 606 is applied from solvent container 605 to substantially wicking substrate 604 at a location to cause the dye or ink 608 to migrate as solvent 606 is carried through substantially wicking substrate 604 in the direction of the bottom edge of substantially wicking substrate 604 by gravity and/or capillary action to produce partially resolved dye molecules 609 (FIG. 6D). The wet substantially wicking substrate can develop or dry while hanging from the suspending means.

Figure 7:
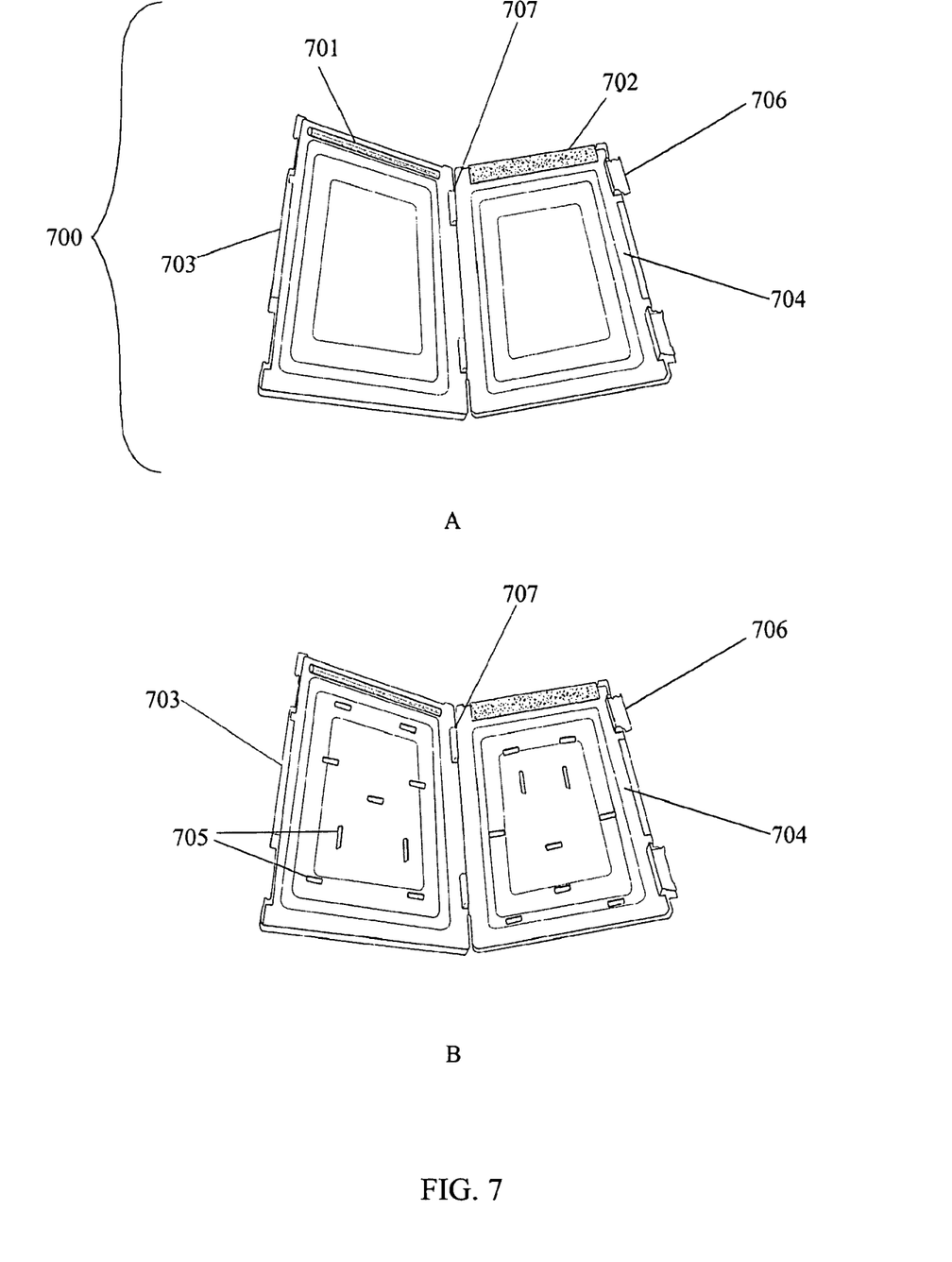
FIG. 7 illustrates an apparatus for developing and or coloring a substantially wicking substrate according to one embodiment of the present invention.

Referring now to FIG. 7, a container that closes to develop the wet substantially wicking substrate is illustrated according to one embodiment of the present invention. FIG. 7A illustrates a container 700 having top tray 703 and bottom tray 704. Top tray 703 and bottom tray 704 are connected with connecting hinge 707 that may be releasable. Top tray 703 and bottom tray 704 comprise an interior face and an exterior face (not shown). About one edge of the interior face of the top tray 703, the bottom tray 704 or both is a substantially wicking substrate fastener 701 and or solvent dispenser 702 that acts to secure a substantially wicking substrate against a solvent dispenser. Alternatively, within a bottom tray there is a compartment (for example a trough) for loading and holding solvent when bottom tray is in horizontal position. Solvent is dispersed onto a substantially wicking substrate when container is repositioned into a vertical position as compared to the horizontal loading position. The fastener 701 may be a protrusion on the surface of the top tray such that when the top container is closed, the protrusion fits snugly against the bottom tray and holds the substantially wicking substrate in place. Alternatively, fastener 701 could be a rod about which the substantially wicking substrate is positioned. In yet another alternative, a fastener could be in the form of a sponge that is partly located on interior face of a top tray 703 and partly located on the interior face of a bottom tray 704. When the container is closed, the two sponges sandwich the substantially wicking substrate there between them when top tray 703 is positioned over bottom tray 704 to close container 700 via the clasp 706. The substantially wicking substrate is held between the two sponges by friction. The sponge may act as the applicator for the solvent which can be applied to the sponge when container 700 is open. Alternatively solvent may be applied to the sponge through a port connecting the inside of container 700 with the outside of container 700. Once the substantially wicking substrate is positioned within container 700 with the ink applied thereto, the solvent from the sponges will cause the dye in the ink to navigate through the substantially wicking substrate by capillary action and/or gravity. In general a substantially wicking substrate can be positioned within the container by a suspending means such as a clamp, adhesive, or wedge, but not limited thereto.

Referring now to FIG. 7B, projections 705 are positioned about the interior face of top tray 703, and/or bottom tray 704. Projections 705 act to keep the substantially wicking substrate from contacting that portion of the interior face of the top tray or the bottom tray that supports projections 705.

A substantially wicking substrate having x, y and z dimensionality will result in three dimensional coloring of the substrate as opposed to a substantially wicking substrate having only an x, and y dimension of ink separation which results in a two dimensional coloring of the substrate.

Changing a solvent system—or—changing the substantially wicking substrate source often produces remarkably different patterns of color during the coloring process. For example, changing from deionized water to tap water (1000 ppm dissolved salts) or to higher concentrations of salt can cause significant effects on the color separations. Using vinegar, sugar water, or soapy water as solvent can produce remarkable changes and differences in color separations. The wet substantially wicking substrate with developed color pattern can be hung up (e.g. on a "clothes line") or placed onto the protective table covering or other non-porous surface to dry. Alternatively the wet paper can be further processed in a second direction causing a two (2) dimensional separation to create color movement in two different directions. When the paper is dry, this "product" can be used in several ways.

The dry colored substrate "product" can be cut "free form" by scissors or knife into a shape or design of the maker's choice (many suggestions below).

An appropriate mask, pattern or overlay can be laid on top of the colored or partially colored zones on the dried product. A pencil can be used to lightly outline the shape of the mask. This outline marks the desired region to be cut out. Then the scissors can be used to cut out the outlined shape from the product. The cutout can be glued onto an appropriate place on a blank card stock or other support.

A greeting card can be formed from artful design created from the colored substrate. On the inside of the card fill in a message (e.g. Happy Birthday, Happy Valentine's Day, Happy Mother's Day, Congratulations, etc). Perhaps leftover colored regions are used to cut out small shapes to glue to and accent the message page. Examples of shapes to use include:

houses, birds, buildings, chimneys, fireplaces, mountains, rocks, bridges
trees, flowers, bushes, plants, leaves, seeds, nuts
boats, sailboats, canoes, kayaks, ships, skidoos,
skis, hockey sticks, balls, soccer balls, baseballs, baseball mitts, basketballs, tennis rackets, golf clubs, golf bags, baseball bats, ball caps, game paraphernalia
oars, paddles, sails, buoys, life vests, lighthouses, tepees, tents, slides
tires, telephone poles, outboard engines, frisbees
horses, cows, dogs, cats, goats, sheep, snakes, alligators,
butterflies, bees, wasps, spiders, insects
cartoon and movie characters, puppets
skeletons, heads, hands, arms, legs, bones faces
wild animals, tigers, lions, giraffes, zebras, elephants
telephones, televisions, computers, cars, motorcycles, bicycles
rugs, blankets, towels, washcloths, flags, pennants, drapes
tables, chairs, beds, furniture
playing cards, hearts, diamonds, spades, clubs
apples, oranges, bananas, grapes, watermelons, fruit
fishing rods, fish, rivers, waterfalls, lakes, sunsets,
sun, moon, stars, sky, clouds, rain
knives, forks, spoons, plates, cups, soda cans, bottles
angels, devils, spears, tridents, crosses, stars of David, religious symbols
swimsuits, bikinis, gloves, mittens, socks, shoes, pants, shirts, items of clothing
windows, doors, shingles,
Christmas items, Christmas trees, wreathes, candles, ornaments,
baskets, boxes, jars,
instruments, violins, flutes, guitars, pianos
flower pots, vases Another embodiment of the present invention comprises an artistic method and kit for creating an art form.

The present invention has been described in terms of preferred embodiments, however, it will be appreciated that various modifications and improvements may be made to the described embodiments without departing from the scope of the invention.

For example, the system and method is suitable for producing earrings, broaches, and pins. The kit may contain a frame and glass window with back for producing a framed artwork for suspending on a wall. The kit may contain wire loops with attached plates for cut-out designs to be affixed for producing earrings for pierced ears. The kit may contain spring back clips for cutout designs to be affixed for producing earrings for unpierced ears. The kit may contain pin-stock or broach pin stock for affixing cutout designs for creating jewelry pins or broaches. The finished jewelry can be spray painted with clear lacquer or coated with nail polish to produce a shiny or glossy effect. An art work like an Alexander Calder mobile can be created for suspending from the ceiling or lamp.

Figure 8:
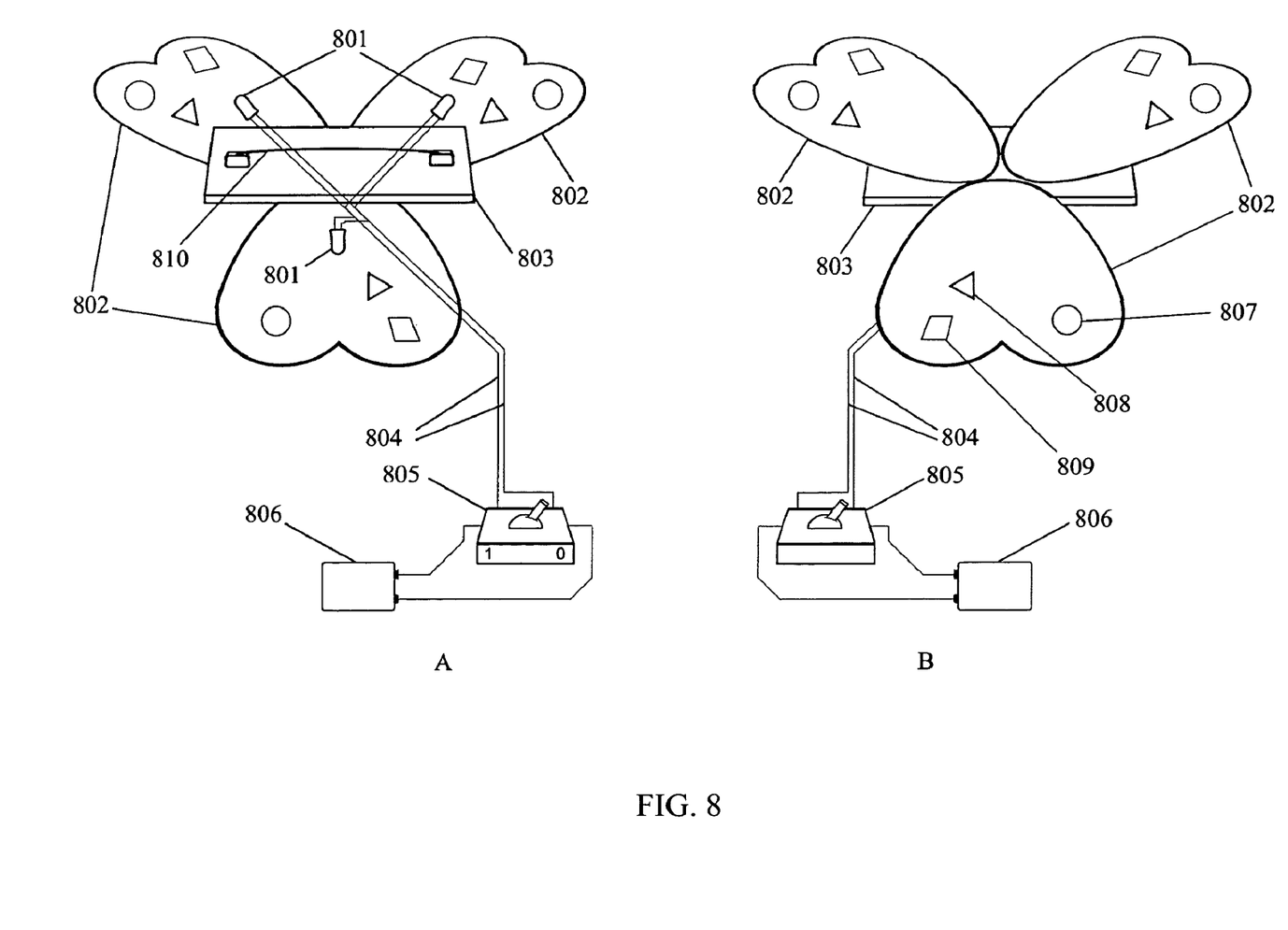
FIG. 8 illustrates an example of illuminated colored substantially wicking substrate affixed to a support.

Referring to FIG. 8B, substantially wicking substrates 802, colored with inks 807, 808 and 809, are suspended by support 803. Substantially wicking substrates 802 are connected to a controller 805 via connector 804. Controller 805 is connected to power source 806. When controller 805 is turned to the on position, substantially wicking substrates 802 are illuminated and can glow in the dark. Substantially wicking substrates 802 can be affixed to a number of assemblies, such as a backing for a pin assembly 810 (see FIG. 8A). FIG. 8A is the bottom view of a pin displaying a colored substantially wicking substrate having illumination lights.

According to another embodiment, illuminated colored substantially wicking substrate can be made from substantially wicking substrate colored with fluorescent and/or phosphorescent dyes. Shapes like butterflies or hearts can be cut out from colored substantially wicking substrate paper dyed with fluorescent inks. These shapes can be affixed to pin back assemblies modified to contain ultraviolet light emitting diodes connected appropriately to an electric circuit. The illuminated colored substantially wicking substrate will "glow in the dark."

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for coloring and shaping a substantially wicking substrate comprising:

applying to a substantially wicking substrate an ink comprising a first dye and a second dye;

applying a first solvent to the substantially wicking substrate to move the first dye and the second dye over a surface area of the substantially wicking substrate in a defined direction;

moving the first dye and the second dye on the surface to color a surface area of the substantially wicking substrate that is greater than the surface area of the substantially wicking substrate to which the ink was originally applied by allowing the first solvent to move through a portion of the first dye for a first distance from the point of origin of the ink and the second dye a second distance from the point of origin of the ink wherein the first distance moved on the surface is sufficiently different from the second distance on the surface to recognize a separation between the first dye and the second dye thereby coloring the substantially wicking substrate;

shaping a portion of the colored wicking substrate into a form; and affixing the form onto a support for display and wherein the ink is initially invisible to the naked eye requiring a secondary treatment for visualization.

2. The method of claim 1 wherein the secondary treatment is selected illumination of the substantially wicking substrate using wavelengths selected between about 200 nm-1500 nm irradiation, heating, chemical treatment, or a combination thereof.

* * * * *